US005207348A

United States Patent [19]

Fischer et al.

[11] Patent Number: 5,207,348

[45] Date of Patent: May 4, 1993

[54] AUXILIARY PAINT BRUSH BUCKET

[76] Inventors: Eric S. Fischer, 818 B Ave., Coronado, Calif. 92118; Rory T. Fischer, 568 Hana Hwy., Paia Maui, Hi. 96779

[21] Appl. No.: 897,945

[22] Filed: Jun. 15, 1992

[51] Int. Cl.$^5$ .................... B01D 35/28

[52] U.S. Cl. .................... 220/697; 220/700

[58] Field of Search .............. 220/695, 697, 700, 698; 210/470, 474

[56] References Cited

U.S. PATENT DOCUMENTS

| | | | |
|---|---|---|---|
| 2,508,947 | 5/1950 | Hoke | 220/698 |
| 2,748,977 | 6/1956 | Sarchet | 220/697 |
| 3,395,828 | 8/1968 | Schnabel | 220/697 |
| 3,581,904 | 6/1971 | Selby | 220/697 |
| 4,583,666 | 4/1986 | Buck | 220/697 |
| 4,865,282 | 9/1989 | Yonkman et al. | 220/697 |
| 4,969,617 | 11/1990 | Desjardins | 220/697 |

FOREIGN PATENT DOCUMENTS

| | | | |
|---|---|---|---|
| 112562 | 2/1941 | Australia | 220/697 |

*Primary Examiner*—Joseph Man-Fu Moy
*Attorney, Agent, or Firm*—Charles C. Logan, II

[57] ABSTRACT

An auxiliary paint brush bucket that has a planar front wall, an arcuate rear wall and a bottom wall to form an open top container. The front surface of the front wall has a plurality of conical shaped raised bumps thereon formed in a predetermined pattern so that a paint roller may be squeezed against the front wall surface to remove excess paint and it runs down the channels between the respective bumps. A unique pair of laterally spaced clips are formed on the top edge of the rear wall so that it can be removably installed along the inner surface of either a two gallon or five gallon paint bucket.

5 Claims, 1 Drawing Sheet

AUXILIARY PAINT BRUSH BUCKET

BACKGROUND OF THE INVENTION

The invention relates to painting and more specifically to an auxiliary paint brush bucket that can be mounted in the interior of a two gallon or five gallon paint bucket along its top edges.

Presently, both amateur and professional painters used hand rollers for applying paint to wall surfaces. These hand rollers are dipped into the bucket of paint and the roller is pressed against some type of a surface for removing the excess paint. Often this surface turns out to be a screen that is detachably mounted in the interior of the bucket adjacent its top edges. Certain surfaces require a paint brush to used, and a separate bucket is required to hold the paint brush when it is not being used. Also, if two different colors of paint are being used, each requires its own separate bucket.

It is an object of the invention to provide a novel auxiliary paint brush bucket that can be detachably installed along the inner surface of a two gallon or five gallon paint bucket.

It is another object of the invention to provide a novel auxiliary paint brush bucket that has a front wall surface formed with conical shaped bumps that function as a paint roller squeeze surface.

It is also an object of the invention to provide a novel auxiliary paint brush bucket that allows for two different colors of paint to be located in a single paint bucket.

It is an additional object of the invention to provide a novel auxiliary paint brush bucket that is economical to manufacture and market.

It is a further object of the invention to provide a novel auxiliary paint brush bucket that helps increase a painter's productivity by saving time and hassle.

SUMMARY OF THE INVENTION

The novel auxiliary paint brush bucket has been designed to be interchangeably mounted in the interior of a two gallon or five gallon paint bucket adjacent its top edges. The auxiliary paint brush bucket has a front wall surface having a plurality of raised conical shaped bumps that have been oriented in horizontal rows that are laterally offset from each other so that the surface of a paint roller can be pressed against the bumps to remove excess paint therefrom. The excess paint travels downwardly in the channels formed between the respective conical shaped bumps.

The auxiliary paint brush bucket would be preferably formed as an integral member by injection molding it from polypropylene material. Since the front wall, rear wall, and bottom wall are all solid, the structure provides an open top container into which paint of the same color or a different color can be poured. Alternatively the open top container can function as a place to put a paint brush when it is not being used when painting alternatively with a roller and a paint brush.

The surfaces are all rounded where the edges of the front wall, rear wall and bottom wall meet each other. This produces rounded corners that allows dried latex paint to be peeled off and it doesn't get stuck in sharp edges between the respective wall surfaces.

DESCRIPTION OF THE PREFERRED EMBODIMENT

Figure 1:
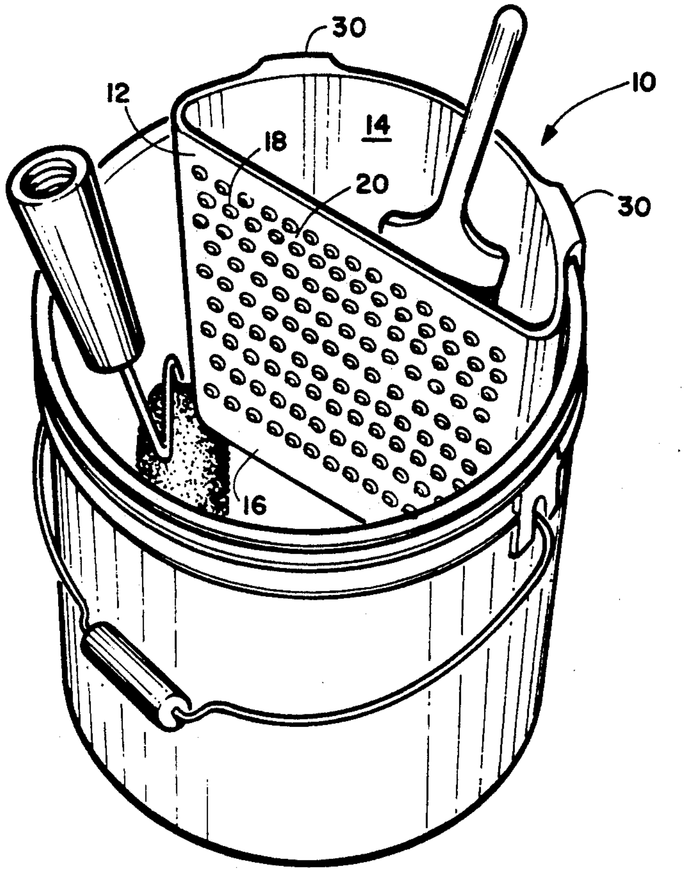
FIG. 1 is front perspective view illustrating the novel auxiliary paint brush bucket mounted in the primary paint bucket.
Figure 3:
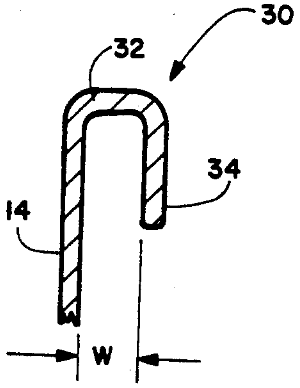
FIG. 3 is a cross sectional view taken along lines 3—3 of FIG. 2.
Figure 4:
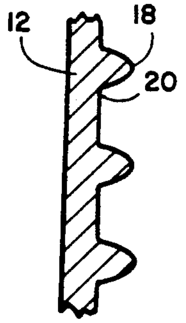
FIG. 4 is a cross sectional view taken along lines 4—4 of FIG. 1.
Figure 2:
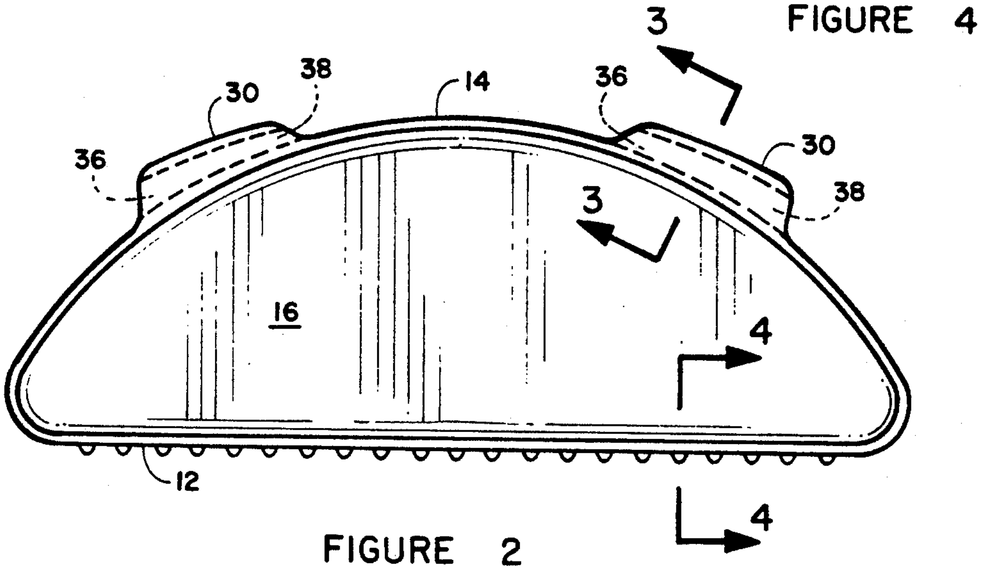
FIG. 2 is a top plan view of the auxiliary paint brush bucket.

The novel auxiliary paint brush bucket will now be described by referring to FIGS. 1-4 of the drawing. The auxiliary paint brush bucket is generally designated numeral 10.

Paint brush bucket 10 has a planar front wall 12, an arcuate rear wall 14 and a bottom wall 16. The surfaces are all rounded where the edges of these respective walls meet each other. Rear wall 14 has a slope of 3.5 degrees which is substantially comparable to the slop of the inside surface of a primary paint bucket.

A plurality of raised conical shaped bumps 18 protrude from front wall 12. These are arranged in horizontal lines that are alternately offset from each other to form a predetermined pattern. The channels 20 between the respective bumps 18 provide a path for the paint to travel along when the paint roller has been pressed and rolled against the protruding bumps 18. The bumps 18 protrude approximately 3 millimeters.

A pair of laterally spaced clips 30 extend radially outwardly from rear wall 14. These clips each have a top wall 32 and a downwardly extending flange 34. Top wall 32 has a width W and this dimension changes from the left side 36 of the clip to the right side 38 of the clip. In one of the clips this dimension goes from greater to smaller while in the other clip it goes from smaller to greater. This allows for a radius of curvature that approximates that of a two gallon paint bucket and also a five gallon paint bucket. Accordingly, the clips will function with either of these two paint buckets.

What is claimed is:

1. An auxiliary paint brush bucket having a paint roller squeeze surface, said device to be removably installed along the inner surface of a two gallon or five gallon paint bucket, said device comprising:
   - an upright oriented solid front wall having no holes or openings having a left edge, a right edge, a top edge, a bottom edge and a front surface;
   - an upright oriented solid rear wall having no holes or openings having a left edge, a right edge, a top edge and a bottom edge, said rear wall having an arcuate curvature so that its left edge is connected to the left edge of said front wall and its right edge is connected to the right edge of said front wall;
   - a solid bottom wall having no holes or openings having edges around its periphery that are connected to the respective bottom edges of said front wall and said rear wall to form an open top container;
   - means for detachably mounting said container on the top edge of the side walls of either a two gallon or five gallon paint bucket; and
   - means on the front surface of said front wall for pressing a paint roller thereagainst to remove excess paint comprising a plurality of raised bumps that protrude from said front wall and channels are formed between the respective bumps to provide a path for the paint to travel along when a paint roller has been pressed or rolled against the protruding bumps.

2. A device as recited in claim 1 wherein the surfaces are all rounded where the edges of said front wall, said rear wall and said bottom wall meet each other.

3. A device as recited in claim 1 wherein said front wall has a planar shape.

4. A device as recited in claim 1 wherein said structure is integrally molded of polypropylene material.

5. A device as recited in claim 1 wherein said means for detachably mounting said container on the top edge of a paint bucket comprises a pair of laterally spaced clips each having a top wall and a downwardly extending flange that is spaced a predetermined distance W from said rear wall, said clips each having an inner end and an outer end with said inner ends being located closest to each other, the distance W between the downwardly extending flanges and said rear wall is smallest at said inner ends and largest at said outer ends.

* * * * *